(12) United States Patent
Yee et al.

(10) Patent No.: US 9,806,624 B2
(45) Date of Patent: Oct. 31, 2017

(54) SYSTEM FOR INFORMATION FEEDBACK THROUGH ISOLATION IN POWER CONVERTERS

(71) Applicant: SYNC POWER CORP., Taipei (TW)

(72) Inventors: Hsian-Pei Yee, Taipei (TW); Yung Ho Tan, Taipei (TW)

(73) Assignee: Sync Power Corp., Taipei (TW)

( * ) Notice: Subject to any disclaimer, the term of this patent is extended or adjusted under 35 U.S.C. 154(b) by 0 days.

(21) Appl. No.: 14/490,143

(22) Filed: Sep. 18, 2014

(65) Prior Publication Data
US 2016/0087540 A1    Mar. 24, 2016

(51) Int. Cl.
*H02M 3/335* (2006.01)

(52) U.S. Cl.
CPC ... *H02M 3/33523* (2013.01); *H02M 3/33576* (2013.01); *H02M 3/33592* (2013.01); *H02M 3/33507* (2013.01); *Y02B 70/1475* (2013.01)

(58) Field of Classification Search
CPC .. Y02B 70/475; G05F 1/575; H02M 3/33592; H02M 3/1588; H02M 3/33576; H02M 3/33523; H02M 2001/003; H02M 2001/0025
See application file for complete search history.

(56) References Cited

U.S. PATENT DOCUMENTS

| | | | | |
|---|---|---|---|---|
| 5,973,945 A * | 10/1999 | Balakrishnan | .... | H02M 3/33576 363/80 |
| 2010/0110732 A1* | 5/2010 | Moyer | ............. | H02M 3/33592 363/19 |
| 2014/0043863 A1* | 2/2014 | Telefus | ............. | H02M 3/33592 363/17 |
| 2014/0098578 A1* | 4/2014 | Halberstadt | ....... | H02M 3/33515 363/21.15 |
| 2014/0268919 A1* | 9/2014 | Yao | ................... | H02M 3/33523 363/21.15 |

* cited by examiner

*Primary Examiner* — Gustavo Rosario Benitez
(74) *Attorney, Agent, or Firm* — Muncy, Geissler, Olds & Lowe, P.C.

(57) ABSTRACT

An information feedback system is disclosed. The information feedback system comprises a separating device having the primary winding and the secondary winding, a first electrical switch and a controller. The secondary winding is coupled to an operation device through the first electrical switch. The first electrical switch and the operation device are coupled to the controller. The energy is discharged from the secondary winding to the operation device through the first electrical switch. The operation device receives the energy from the first electrical switch to generate a plurality of commands. The controller receives the commands and uses the first electrical switch to encode a plurality of signals to generate encoded information according to the commands. The separating device transmits the encoded information from the secondary winding to the primary winding.

8 Claims, 4 Drawing Sheets

US 9,806,624 B2

SYSTEM FOR INFORMATION FEEDBACK THROUGH ISOLATION IN POWER CONVERTERS

BACKGROUND OF THE INVENTION

Field of the Invention

The present invention relates to a feedback methodology in the switching power supply, particularly to an information feedback system using a separating device.

Description of the Related Art

Due to the fact that internal elements of most electric devices require direct-current (DC) voltages, a power supply is used to convert alternating-current (AC) voltages or DC voltage into the DC voltages such that the electric device operate well. The power supply is divided into nonisolated power supplies and isolated switching power supplies. Isolated power supplier, with an inclusion of a power transformer, is used for most AC to DC, and some DC to DC converters, for safety and other performance considerations. There are various topologies for such converters; examples of such isolated converters topologies including Flyback, Forward, Qusai-Resonant, Full Bridge, Half-Bridge and Push-Pull.

Take Flyback power supply as an example. As shown in FIG. 1, an isolated power converter includes a transformer 10 having a primary side and a secondary side and an N-channel metal oxide semiconductor field effect transistor (NMOSFET) 12 connected to the primary side. The secondary side is connected with an operating system 14. An input high voltage $V_H$ is applied to the primary side. A voltage $V_G$ is periodically applied to the gate of the NMOSFET 12 to control the transfer of power from the primary side to the secondary side. When the NMOSFET 12 is turned on, the energy is stored in the transformer 10. As the NMOSFET 12 is turned off, the stored energy in the transformer 10 is discharged.

Isolated converters typically use optocoupler 16 for the secondary side to send information back to the primary side for controlling the output voltage, current and various conditions. The isolation by power transformer 10 is required for safety considerations, but this isolation prevents the direct information feedback from the secondary (output) side to the primary side (input). Traditionally, the secondary side information is passed through an optocoupler 16, which allows information to be passed through the isolation.

While the optocoupler 16 serves its purpose, it has a number of disadvantages listed below: (1) Relative slow response, typically takes many converter cycles for the corresponding optocoupler operation. Thus, slows the primary controller response, and impact the converter performance. (2) Only simple information can be transmitted through optocoupler due to it's slow speed. (3) Optocoupler is an added component, not in the power path.

To overcome the abovementioned problems, the present invention provides an information feedback methodology, so as to solve the afore-mentioned problems of the prior art.

SUMMARY OF THE INVENTION

A primary objective of the present invention is to provide an information feedback system, which adopts a separating device to provide a feedback path for rapidly transmitting encoded information within the power path, thereby allowing improved controlling of the power converter without additional complicated non-power path circuitry.

To achieve the abovementioned objectives, the present invention provides an information feedback system, which comprises a power transformer used as a separating device having the primary winding and the secondary winding, and the secondary winding discharges energy; a first electrical switch; an operation device; and a controller. The secondary winding is coupled to the operation device through the first electrical switch receiving the energy. The operation device receives the energy from the first electrical switch to generate a plurality of commands. The first electrical switch and the operation device are coupled to a controller, which receives the commands, and which uses the first electrical switch to encode a plurality of signals to generate encoded information according to the commands. The separating device transmits the encoded information from the secondary winding to the primary winding.

Below, the embodiments are described in detail in cooperation with the drawings to make easily understood the technical contents, characteristics and accomplishments of the present invention.

DETAILED DESCRIPTION OF THE INVENTION

Figure 1:
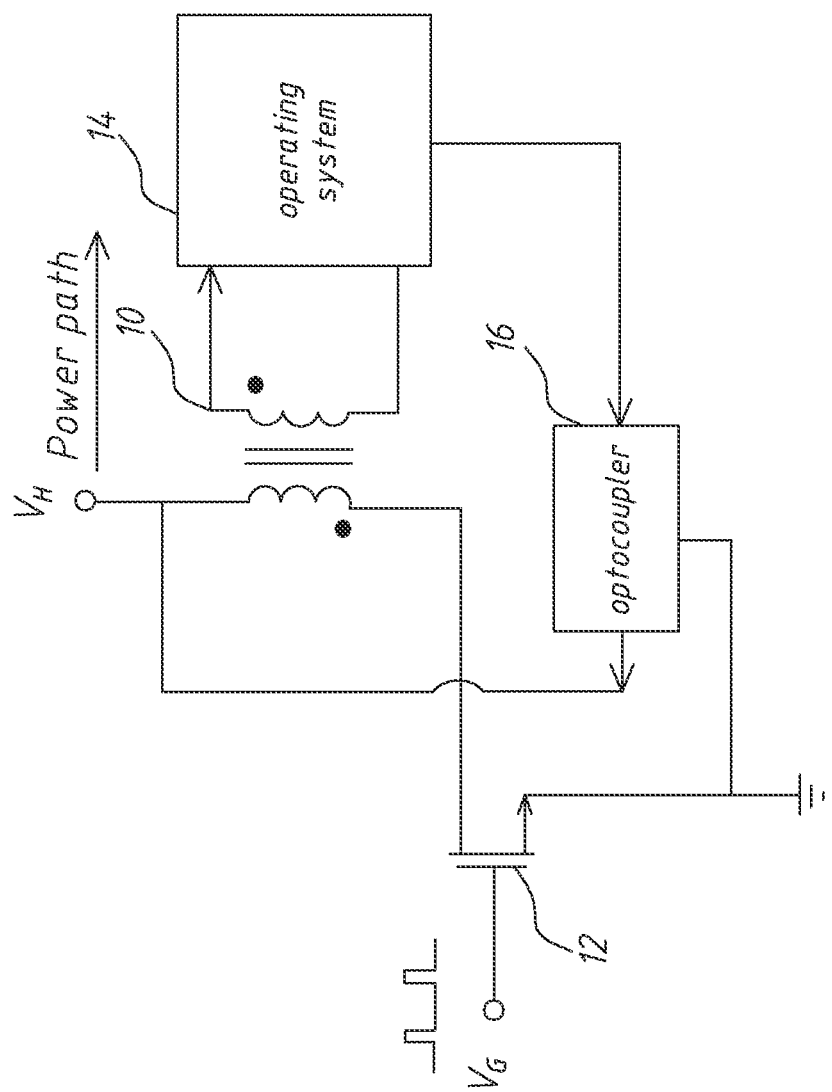
FIG. 1 is a schematic diagram illustrating a portion of a power converter circuit of the prior art.
Figure 2:
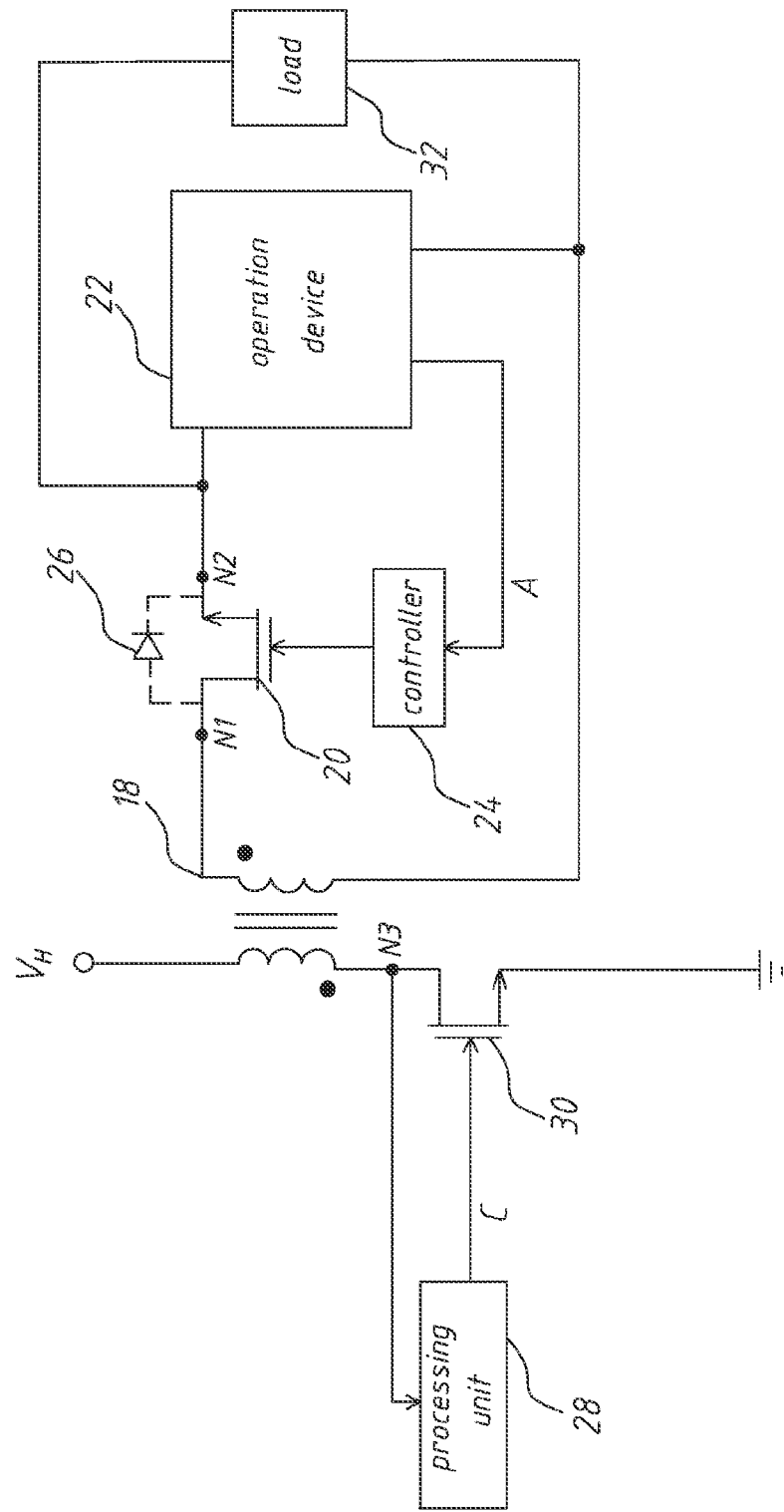
FIG. 2 is a schematic diagram illustrating an information feedback system according to an embodiment of the present invention.
Figure 3:
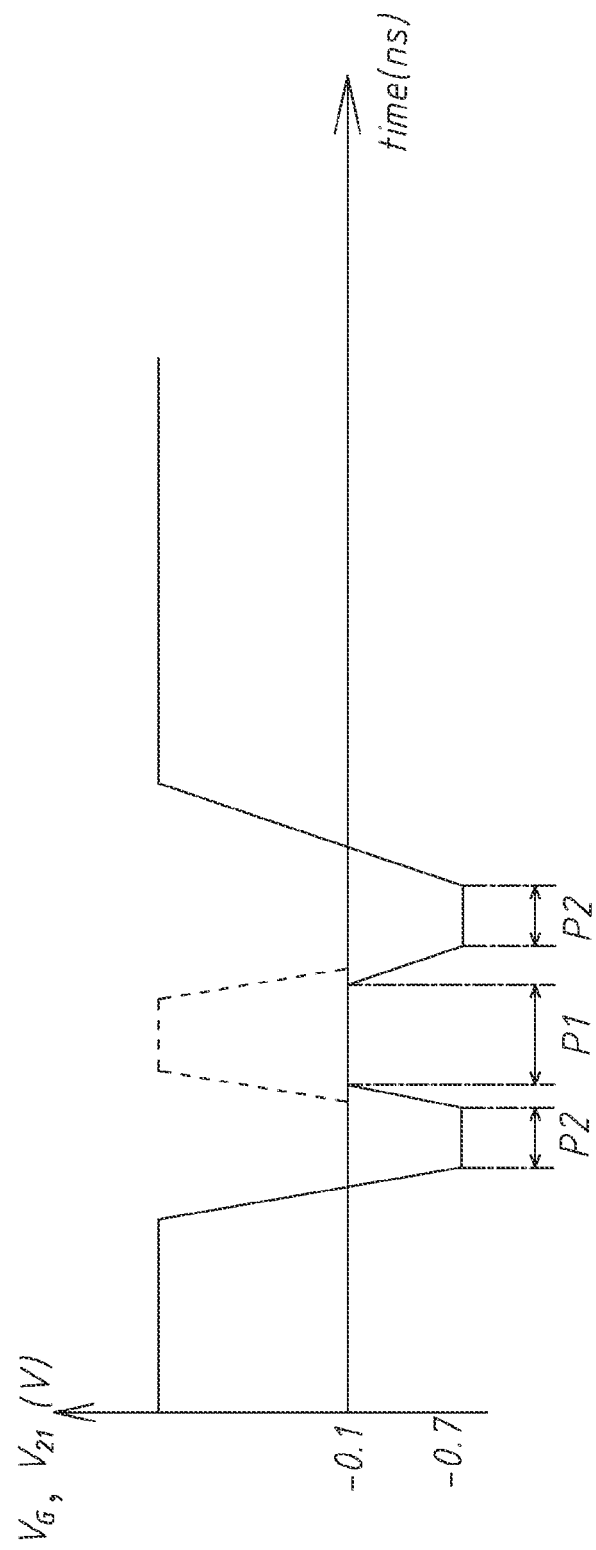
FIG. 3 and FIG. 4 are diagrams illustrating the gate voltage and the voltage drop of the first electrical switch according to an embodiment of the present invention.

Refer to FIG. 2 and FIG. 3. The present invention comprises a separating device 18 having the primary winding and the secondary winding. In the embodiment, the separating device 18 is exemplified by a transformer. The primary winding is coupled to a high-voltage terminal $V_H$, and the primary winding receives and stores energy from the high-voltage terminal $V_H$, and then the energy is discharged from the secondary winding. Besides, a first electrical switch 20, for example, but not limited to a metal oxide semiconductor field effect transistor (MOSFET) or an insulated gate bipolar transistor (IGBT), is coupled to the secondary winding and coupled between the secondary winding and an operation device 22, and receives the energy from the secondary winding. The operation device 22 receives the energy from the first electrical switch 20 to generate a plurality of commands A. The first electrical switch 20 and the operation device 22 are coupled to a controller 24 receiving the commands and using the first electrical switch 20 to encode a plurality of signals to generate encoded information according to the commands A.

Figure 4:
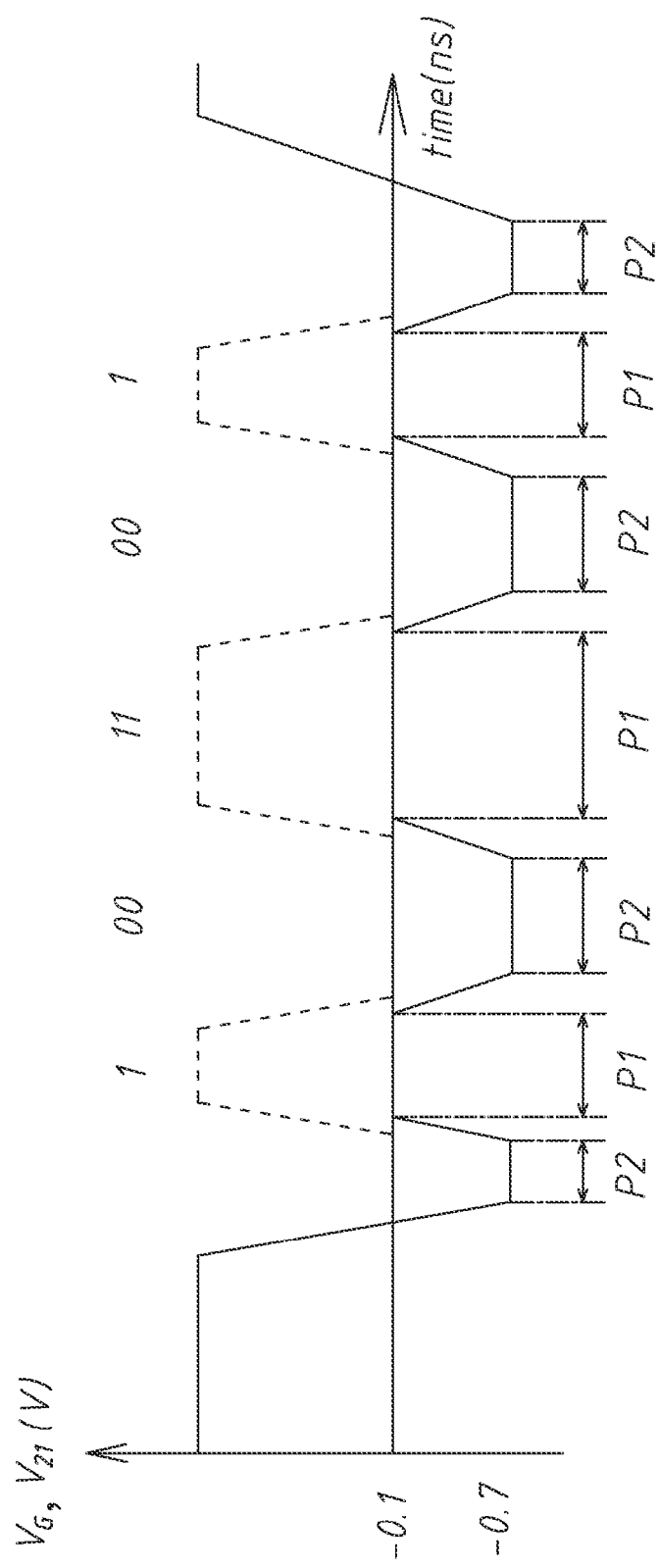

The first electrical switch 20 is exemplified by a MOSFET. The first electrical switch 20 has a first node N1 and a second node N2 respectively used as the drain and the source of the MOSFET. The first node N1 and the second node N2 are respectively coupled to the secondary winding and the operation device 22. A parasitical diode 26 of the MOSFET exists between the first node N1 and the second node N2. When the energy is discharged from the secondary winding, the parasitical diode 26 is forward biased. Meanwhile, the controller 24 receives the commands A to control the conduction state of the first electrical switch 20 to change a voltage drop $V_{21}$ across the second and first nodes N2 and N1 as the encoded information. When the controller 24 turns on the first electrical switch 20, the gate voltage $V_G$ of the MOSFET is a high voltage. When the controller 24 turns off the first electrical switch 20, the gate voltage $V_G$ of the MOSFET is a low voltage. Refer to FIG. 3 and FIG. 4. A solid line and a dash line respectively denote the voltage drop $V_{21}$ and the gate voltage $V_G$. Before the first electrical switch 20 is completely turned on, the gate voltage $V_G$ starts to rise to the high voltage, and puts the first electrical switch 20 into the ON state. When the gate voltage $V_G$ reaches the low voltage, the first electrical switch 20 becomes the OFF state. During the period where the transformer 18 is discharging energy to the secondary side, the alternating $V_G$ changes the conduction state of the MOSFET. When the MOSFET is in the ON state, $V_{21}$ is close to zero volts, whereas MOSFET is in the OFF state, $V_{21}$ is that of the Diode Forward voltage. This alternation in $V_G$ is giving by the controller 24 and the operation device 22, and the specific way the $V_G$ is alternating represent coded information that the operation device 22 and controller 24 want to transit to the primary side via the transformer. The coded alternating $V_G$ is reflected by the $V_{21}$ of the MOSFET. When $V_G$ is high, $V_{21}$ is approximately Zero Volt as a first voltage. When $V_G$ is low, $V_{21}$ is approximately diode forward voltage as a second voltage different the first voltage. This corresponding change in $V_{21}$ is reflected through the transformer, and decoded by processing unit 28 on the primary side.

The first voltage appears during at least one first period P1, and the second voltage appears during at least two second periods P2. When the first electrical switch 20 is turned on, the voltage drop $V_{21}$ is the first voltage equal to approximately zero, say −0.1 V. When the first electrical switch 20 is turned off, the voltage drop $V_{21}$ is the second voltage equal to approximately diode forward voltage, say −0.7 V. In addition, the coding allows the first and second periods P1 and P2 to have different or identical lengths. For example, as shown in FIG. 4, the first and second periods P1 and P2 respectively have 100 ns and 100 ns. Thus, the encoded information corresponding to the first and second periods P1 and P2 is respectively 1 and 0. The first and second periods P1 and P2 respectively have 100 ns and 200 ns. Thus, the encoded information corresponding to the first and second periods P1 and P2 is respectively 1 and 00. The first and second periods P1 and P2 respectively have 200 ns and 100 ns. Thus, the encoded information corresponding to the first and second periods P1 and P2 is respectively 11 and 0. The transformer as the separating device 18 transmits the encoded information from the secondary winding to the primary winding. The transformer is used as a power path but also a feedback path for transmitting the encoded information without using any additional component. Therefore, the complicated information is rapidly transmitted through the feedback path.

The primary winding of the transformer is coupled to a processing unit 28 receiving the encoded information from the primary winding and decoding the encoded information to generate a control signal C according to the encoded information. The processing unit 28 and the primary winding of the separating device 18 are coupled to a second electrical switch 30 receiving the control signal C to switch a conduction state thereof. The high-voltage terminal $V_H$ updates the energy stored in the primary winding according to the conduction state of the second electrical switch 30, thereby improving the efficiency of providing energy.

The operation of the present invention is described below. The operation device 22 is coupled to a load 32. In the beginning, the second electrical switch 30 is turned on, so that the primary winding of the separating device 18 receives and stores the energy from the high-voltage terminal $V_H$. Then, the second electrical switch 30 is turned off, so that the energy is discharged from the secondary winding of the transformer. Meanwhile, the load 32 changes from a light-load state to a heavy-load state. As a result, the operation device 22 receives the energy from the first electrical switch 20, detects this change and uses the energy to generate the commands A corresponding to the load state. Then, the controller 24 receives the commands A to control the conduction state of the first electrical switch 20 to change the voltage drop $V_{21}$ as the encoded information, and then the encoded information is outputted from the first electrical switch 20. Since the voltage of a third node N3 between the transformer and the second electrical switch 30 equals to the high voltage of the high-voltage terminal $V_H$ plus the voltage of the second node N2 and the voltage drop $V_{21}$, the transformer transmits the encoded information from the secondary winding to the primary winding. Afterwards, the processing unit 28 receives the encoded information from the primary winding and decodes the encoded information to generate the control signal C. Then, the second electrical switch 30 receives the control signal C to switch the conduction state thereof. For example, the switching frequency of the second electrical switch 30 is changed due to the control signal C. Consequentially, the high-voltage terminal $V_H$ updates the energy stored in the primary winding according to the conduction state of the second electrical switch 30, thereby updating the energy discharged from the secondary winding of the separating device 18.

In conclusion, the complicated information can be rapidly transmitted from the secondary to the primary winding through the power path, thereby improving and simplify the control of power conversion.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. An information feedback system, comprising:
   a separating device having a primary winding and a secondary winding, and said primary winding is coupled to a high-voltage terminal, and said primary winding receives and stores energy from said high-voltage terminal, and then said secondary winding discharges said energy;
   a first electrical switch coupled between said secondary winding and an operation device, and said first electrical switch has a first node and a second node, and said first node and said second node are respectively coupled to said secondary winding and said operation device, and said operation device receives said energy through said first electrical switch to generate a plurality of commands according to a change that occurs when said first electrical switch is turned "on" and "off", wherein the change is a voltage differentiation at said first node that is communicated with said first electrical switch;
   a controller coupled to said first electrical switch and said operation device, receiving said commands as an encoded information, and controlling a conduction state of said first electrical switch according to said change, and said separating device transmits said encoded information from said secondary winding to said primary winding;

a processing unit directly coupled to said primary winding, directly receiving said encoded information embedded within power transfer, and decoding said encoded information embedded within power transfer to generate a control signal according to said encoded information; and a second electrical switch coupled to said processing unit and said primary winding, receiving said control signal to switch a conduction state thereof, and said high-voltage terminal updates said energy stored in said primary winding according to said conduction state.

2. The information feedback system of claim 1, wherein said voltage drop is a first voltage or a second voltage different from said first voltage.

3. The information feedback system of claim 2, wherein said first voltage appears during at least one first period, and said second voltage appears during at least two second periods.

4. The information feedback system of claim 3, wherein said first and second periods have different or identical lengths.

5. The information feedback system of claim 2, wherein said first and second voltages respectively are approximately zero volt and approximately diode forward voltage.

6. The information feedback system of claim 1, wherein said first electrical switch is a metal oxide semiconductor field effect transistor (MOSFET) or an insulated gate bipolar transistor (IGBT).

7. The information feedback system of claim 1, wherein said separating device is a transformer.

8. The information feedback system of claim 1, wherein said operation device is coupled to a load, and said change is a fact that said load changes from a light-load state to a heavy-load state.

* * * * *